Aug. 13, 1946.  H. H. GREGER  2,405,884
METHOD OF PREPARING ALUMINUM PHOSPHATES
Filed July 13, 1943
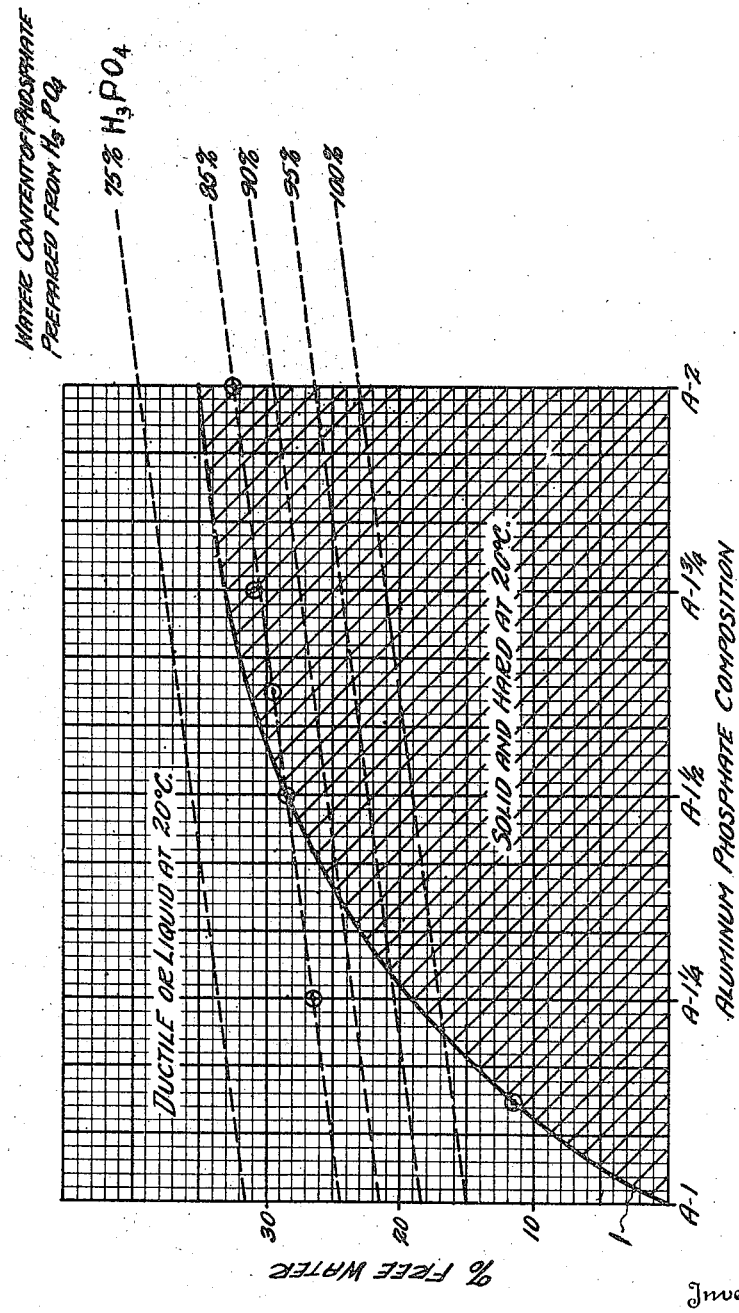
Inventor
HERBERT H. GREGER
By Semmes, Keegin Beale & Semmes
Attorneys Patented Aug. 13, 1946

2,405,884

UNITED STATES PATENT OFFICE 2,405,884

METHOD OF PREPARING ALUMINUM PHOSPHATES

Herbert H. Greger, Washington, D. C.

Application July 13, 1943, Serial No. 494,526

11 Claims. (Cl. 23—105)

This invention relates to aluminum phosphates and more particularly has reference to a method of preparing soluble aluminum phosphates which are solid at room temperature.

This invention is directed to the preparation of aluminum phosphates of the type described in my copending application Serial No. 490,495, filed June 11, 1943.

I have found that solid aluminum phosphates can be prepared by reacting aluminum hydrate in finely divided form with phosphoric acid of high concentration. If the reaction is not controlled, however, difficulty is encountered in that the product sets rapidly into a hard mass which may be insoluble.

The difficulties in the preparation of the water soluble solid form of aluminum phosphates, particularly those close to and above the sesqui-phosphates, are largely due to their colloidal nature which is related to the water of hydration in the compound. Only the phosphates having a low aluminum content, such as the mono-aluminum phosphate, can be nearly free of water and still remain soluble. They must be nearly free of water before they will solidify and even after solidification such compounds are very ductile. On the other hand, higher aluminum phosphates, such as the di-aluminum phosphate, may contain as much as 25% water and yet be in the form of a hard, brittle solid at room temperatures. If the higher aluminum phosphates, that is, those above the sesqui-aluminum phosphate, are formed with a very low water content, it will be found that the product may no longer be fully soluble in water.

An object of this invention is to provide a method of preparing soluble aluminum phosphates which are solid at room temperatures.

Another object of this invention is to provide a method of preparing soluble aluminum phosphates which are solid at room temperature, which involves controlling the speed of reaction to avoid excessive removal of the water content from the reaction mass.

A further object of this invention is to provide a method of making soluble aluminum phosphates, solid at room temperatures, by reacting an aluminum compound and phosphoric acid or phosphorus pentoxide in the presence of a heat abstracting medium.

Still another object of this invention is to provide a method of making soluble aluminum phosphates solid at room temperatures by reacting an aluminum compound and phosphoric acid or phosphorus pentoxide, by dispersing the reactants in an inert organic liquid and carrying out the reaction while dispersed.

A still further object of this invention is to provide a method of making soluble aluminum phosphates solid at room temperatures by reacting an aluminum compound and phosphoric acid or phosphorus pentoxide, by dispersing the reactants in separate portions of inert hydrocarbon liquids and then mixing the dispersions.

With these and other objects in view, which will appear more fully hereinafter, the present invention resides in the method hereinafter set forth and the steps followed in carrying out the same.

In the drawing, the single figure is a diagram showing the physical state of aluminum phosphates in relation to the content of free water and composition.

The phosphates to which the present invention relates are those comprised between mono-aluminum phosphate and di-aluminum phosphate, in which the ratio of aluminum to the PO$_4$ radical ranges from 1:3 for mono-aluminum phosphate, Al(H$_2$PO$_4$)$_3$ to 2:3 for di-aluminum phosphate, Al$_2$(HPO$_4$)$_3$. Many of the phosphates lying at intermediate points in this range have highly desirable properties and are valuable products. The particular compound that is formed depends upon the proportions of the materials which enter into the reaction for the formation of the aluminum phosphate.

The various aluminum phosphates ranging from mono- to di-aluminum phosphates may exist in the liquid or solid phase depending upon the amount of water that is present and the temperature of the product. As illustrated in the single figure of the drawing, a mono-aluminum phosphate designated A—1, that is, an aluminum phosphate in which the ratio of aluminum to PO$_4$ is 1:3 at 20° C. will be a ductile solid when the water content is substantially zero. An aluminum phosphate, such as the sesqui-aluminum phosphate, in which the ratio of aluminum to PO$_4$ is 1½:3 and designated on the drawing as A—1½, will be solid at 20° C. with a water content of over 25%. The solid di-aluminum phosphate designated on the drawing as A—2 may have, at 20° C., a water content of about 35%.

The curve 1 shown in the drawing represents a zone or line of demarcation between liquid or ductile solid and hard solid aluminum phosphates at 20° C. for phosphates lying between mono- and di-aluminum phosphates at various water contents. The slightly inclined, substantially horizontal dotted lines represent the water content of aluminum phosphates prepared from phosphoric acids of various concentrations. For instance, it will be noted that when an aluminum phosphate is prepared from aluminum hydrate with 100% phosphoric acid, the product will have a water content low enough so that for most of the products it will be in the solid phase. On the other hand, when an aluminum phosphate is made from aluminum hydrate and phosphoric acid of 75% concentration, it will be noted that all of the products are in the liquid phase. This is due to the relatively high water content which is introduced into the product from the dilution of the phosphoric acid.

The water content originates from the content of free water in the acid and from the water of reaction. The latter is important and must not be overlooked as in some cases it may be larger than the amount of free water carried into the compound from the acid.

From the mono- to the sesqui- to the di-aluminum phosphate, the properties change as the aluminum to phosphate ratio increases. For instance, the mono-aluminum phosphate and the compositions close to it have a relatively good solubility in water even when dehydrated at a temperature of 300° F. while the solubility of the higher phosphates may be considerably impaired or even destroyed by heating and drying at this temperature.

In order to understand the solubility of the sesqui- and of the di-aluminum phosphates, it is necessary to consider their colloidal nature. In relatively concentrated solutions where hydrolysis is essentially absent, these phosphates have the properties of colloids. The colloidal state of these solutions is retained in the solids if water is gradually removed from such solutions by drying at moderate temperatures below about 50° C. and hydrated solids are formed. These will disperse in water and form clear, viscous solutions by virtue of their colloidal structure. If this structure is destroyed, the resulting solids are for the most part insoluble in water.

It is very interesting to note that at room temperature the solid state is obtained long before all water is removed. This water is of importance for preserving the solubility of the higher phosphates and the percentage of water retained varies with the alumina-phosphate ratio for a given degree of hardness. For example, at a point where pulverizing can be readily accomplished, the sesqui-aluminum phosphate may contain about 25%, the di-aluminum phosphate as much as or considerably more than 25% of water of hydration.

The solid aluminum phosphates in their hydrated form are essentially an extension of the liquid state or vice versa. By careful control of the water content, it is possible to produce any desired viscosity whether the starting materials are the liquid or the solid aluminum phosphates.

The latter have the appearance of a hard, translucent resin-like material of conchoidal fracture. When heated, they become soft and finally melt to a viscous fluid. When rapidly heated and the temperature reaches the range above 230 to 250° F., depending on the type of phosphate, the vapor pressure increases to above atmospheric pressure and the melted material bloats and froths until the dehydration has progressed to the point where it solidifies. This residue is not fully inert to water but the colloidal state cannot be recovered without re-processing.

For commercial purposes, the aluminum phosphates can be handled in many cases much more conveniently in solid than in liquid form. This is true not only for shipping purposes but also in actual product manufacture. A finely divided solid can in many cases be mixed very effectively with other dry, powdered substances. Water may subsequently be introduced in the necessary amount.

There is an essential difference in the production requirements of a liquid and a solid aluminum phosphate. As the water content becomes smaller, such factors as the control of mixing, temperature and rate of reaction and the regulation of the exact water content in the final product becomes more and more difficult.

Several factors have a bearing on this situation. First of all, the aluminum hydrate is not a "strong" base and from the dissociation constants of the secondary and the tertiary hydrogen of the phosphoric acid, it will be seen that once the mono-aluminum phosphate is formed the remaining hydrogens belong to a relatively "weak" or sluggishly reacting acid. For this reason, it is necessary to use, in the production of the higher phosphates, a very finely divided aluminum hydrate and to get it intimately and very uniformly distributed with respect to the phosphoric acid or the phosphoric anhydride, if this is used in place of the acid. The finely divided state and intimate contact will of necessity promote the rate of reaction and consequently a large amount of heat of reaction will be liberated in a very brief space of time. This in turn will have the undesired effect that some of the water intended as a constituent of the final product will be boiled out or lost and the water content will become indefinite. The product may then set up when still hot to a hard mass almost immediately and it may be quite difficult to remove it from the reaction vessel. For all practical purposes, it will be nearly impossible to obtain the necessary perfect uniformity. In mixing a very finely divided base and acid together, even if the temperature is held down by cooling with water, the reaction usually gets under way and out of hand before the mixing is complete. This again results in a non-homogeneous product containing lumps of unreacted base and a tacky liquid deficient in aluminum which will not solidify.

It is therefore important to control the reaction rate in order to gain the necessary time for complete mixing. Aside from this, it is necessary to keep the final reaction temperature down for reasons that will become apparent later.

In some instances, it will be necessary to establish the limits of water content because it has been found that for some purposes solid aluminum phosphates which have been dried to too great an extent will not be as useful as the products having the maximum permissible water content for comminuting, or a somewhat lower water content. While it may be unimportant in a number of cases to produce an aluminum phosphate having the maximum permissible water content for the solid state, i. e. aluminum phosphates lying just below the borderline indicated by reference character 1 in the drawing, for such purposes as plastic, hot molding compositions, it seems desirable to form solid aluminum phosphates having the maximum practical water content permissible in the solid phase at room temperature.

The solid state also depends on the temperature of the phosphate, and of course a high fluidity of the phosphate at a given temperature will depend on both water content and composition with a tendency toward increased viscosity in the higher aluminum phosphates.

For the production of soluble phosphates, it is not necessary to stay close to the borderline of the solid phosphate, but the water content may be appreciably lower. In fact, the phosphates of low alumina content may be almost fully dehydrated and still have a good solubility.

The present invention provides for the control of the reaction by introducing and mixing the reactants in a liquid medium which somewhat inhibits the reaction. This reduces the speed of the reaction and provides the necessary time for completing the mixing. By carrying out the reaction in the liquid medium, the heat evolved is absorbed and prevents overheating of the reaction mass. Following the procedure of the present invention, aluminum hydrate and phosphoric acid are separately dispersed in portions of a light hydrocarbon such as kerosene, dry cleaning fluid (varsol and the like), a heavy gasoline fraction, toluene, xylene, etc. After forming the dispersions of the reactants, the suspension of aluminum hydrate is introduced into the suspension of acid while thoroughly agitating the mass as it is mixed.

The dispersion of the hydrate can be promoted by the addition of a small amount of fatty acid, such as oleic acid, to the hydrocarbon. Assuming now that both the acid and the hydrate suspension were poured into a common container (reaction vessel) and dispersed in finely divided state in the organic liquid, the phosphoric acid has a preferential wetting power for the aluminum hydrate over that exercised by the hydrocarbon and if the agitation is kept up, acid and hydrate particles will unite under conditions that assure perfect uniformity. While this association process of acid and base is going on, the chemical reaction between the two constitutents will gradually proceed and heat will be evolved. This heat must be taken up by the hydrocarbon and its volume must be sufficiently large to do this effectively; in other words, enough of the organic liquid must be in the batch to prevent it from exceeding a certain final temperature. For best results, this temperature should lie between 160 and 180° F.

As the aluminum phosphate forms, it separates from the hydrocarbon as a second liquid phase and in this form it can be drained from the reaction vessel into molds where it is left to solidify. The organic liquid is pumped through a cooler and used over again in the batch.

The solidification of the colloidal aluminum phosphate solution has nothing in common with crystallization but is a change of state simply due to cooling or a transition from a colloidal liquid into a colloidal or glassy solid.

If phosphoric acid is used for the preparation of the phosphate, a portion of the water of hydration in the final product may be conveniently introduced as water of dilution in the acid. Another portion will be formed as water of reaction from acid and base.

If phosphoric pentoxide is used instead of the acid, all water that is needed in the aluminum phosphate has to be added from outside. It is not of particular importance where the water is added in the process. However, its introduction into the reaction vessel proved to be most convenient.

The process is then carried out as follows: The finely divided phosphorus pentoxide and aluminum hydrate are suspended separately in a suitable quantity of light hydrocarbon oil in the same way as explained above. The two suspensions are brought together in a reaction vessel and the agitation continued. Unlike the acid, the phosphorus pentoxide does not react to any large extent with the aluminum hydrate at room temperature in the absence of moisture. However, the two substances associate or agglomerate readily, probably due to a difference in electric charge. The necessary amount of water may then be added in a small stream. The suspension breaks roughly at the point where enough water was added to form 100 per cent phosphoric acid ($H_3PO_4$). A second liquid phase then forms and the rest of the water may be added without causing any inhomogeneity. The precipitated phosphate is drawn off and treated as explained before.

To prepare mono-aluminum phosphate, one mol or 156 grams of aluminum hydrate ($Al_2O_3.3H_2O$) in finely divided form is dispersed in about 2-3 liters of kerosene by agitating the mass. A second dispersion of finely divided phosphorus pentoxide ($P_2O_5$) consisting of about 3 mols of 426 grams of $P_2O_5$ in 2-3 liters of kerosene is made by mixing and agitating the mass. The two dispersions are mixed and agitated until agglomeration takes place. At this point, about 54 grams of water may be added which combines with the reaction mass. The resulting reaction product contains no free water, the added water combining with the $P_2O_5$ to form phosphoric acid.

A sesqui-aluminum phosphate having an aluminum to phosphate ratio of 1½:3 may be prepared by mixing a dispersion consisting of 234 grams or 1½ mol of aluminum hydrate in about 2-3 liters of kerosene with a dispersion of about 426 grams or 3 mols of $P_2O_5$ in about 2-3 liters of kerosene. To this mass there is added about 255 grams of water which results in a product containing about 27.9% of free water. The percentage of free water in this instance is maintained high so that the resulting product while being a solid at room temperature will nevertheless be soluble. As hereinbefore pointed out, if the sesqui-aluminum phosphate is made with a very low water content, the product will probably be partly insoluble.

The di-aluminum phosphate may be made in accordance with the present invention by reacting 2 mols or 312 grams of aluminum hydrate with 3 mols or 426 grams of phosphorus pentoxide. In this instance, 250 grams of water should be added to the reaction mass and this, together with about 54 grams of water produced by the reaction between the aluminum hydrate and the resulting phosphoric acid, will make a total of 304 grams of water present in the reaction mass. This product will have a free water content of approximately 30.8% which will result in a product solid at room temperature but yet soluble in water.

The aluminum hydrate used in the above examples should be finely divided and may comprise a product having a particle size ranging between .3 and .6 micron.

When phosphoric acid is used instead of phosphorus pentoxide, the amount of water added will be less since part of the water which is required in the case of the phosphorus pentoxide will be present in the acid.

The process may be handled either on the batch principle or as a continuous operation. For the batch process will be needed a storage tank for the kerosene, a mixing tank each for the acid and the hydrate with a high speed agitator in each, and a reaction tank also fitted with an agitator. The reaction tank must be equipped with a discharge for the aluminum phosphate, a pump and a heat exchanger for cooling the oil and returning it to the storage tank.

The continuous process has the same essential elements in the equipment but in addition the necessary automatic charging and discharging devices.

Generally, a given aluminum phosphate having a certain water content and which is solid at a given temperature will be solid at lower temperatures but may not be solid at a higher temperature. By reducing the water content of the material, it will remain solid even at higher temperatures. The aluminum phosphates which are soluble and are solid at room temperatures are very useful in the manufacture of various products in which aluminum phosphates act as binders, etc. The present invention provides a simple and yet very satisfactory method of controlling the formation of soluble aluminum phosphates which are solid at room temperatures.

From the foregoing description, it will be appreciated that the present invention provides a method of preparing soluble aluminum phosphates solid at room temperature in which the rate of mixing of the reactants and the temperature of reaction can be controlled to produce a desired end product.

I claim:

1. A method of preparing water soluble aluminum phosphates solid at room temperature comprising dispersing reactible compounds consisting on the one hand of finely divided aluminum hydrate and on the other hand of a compound selected from the group consisting of phosphorus pentoxide and phosphoric acid separately in separate portions of an inert nonaqueous liquid, mixing said dispersions, adding water, the reactants being present in the mixture of dispersions in the ratio ranging between 1 Al to 3($PO_4$) and 2 Al to 3($PO_4$), controlling the water content of the reaction product through the water content of the reactants, added water and reduction of evaporation to form a product having a water content low enough to render the product solid at room temperature but high enough to maintain the water soluble property thereof, and separating the aluminum phosphate formed.

2. A method of preparing water soluble aluminum phosphates solid at room temperature comprising dispersing reactible compounds consisting on the one hand of a finely divided aluminum hydrate and on the other hand of a finely divided compound selected from the group consisting of phosphorus pentoxide and phosphoric acid separately in separate portions of an inert nonaqueous liquid, mixing said dispersions, adding water, the reactants being present in the mixture of dispersions in the ratio ranging between 1 Al to 3($PO_4$) and 2 Al to 3($PO_4$), controlling the water content of the reaction product through the water content of the reactants, added water and reduction of evaporation to form a product having a water content ranging from zero for the 1:3 ratio to slightly over 25% for the 1½:3 ratio to about 35% for the 2:3 ratio, and separating the aluminum phosphate formed.

3. A method of preparing water soluble aluminum phosphates solid at room temperature comprising dispersing a finely divided aluminum hydrate and a finely divided phosphoric acid separately in separate portions of a nonaqueous inert liquid, mixing said dispersions, the reactants being present in the mixture of dispersions in the ratio ranging between 1 Al to 3($PO_4$) and 2 Al to 3($PO_4$), and separating the aluminum phosphate formed.

4. A method of preparing water soluble aluminum phosphates solid at room temperature comprising dispersing with the aid of a promoter reactible compounds consisting on the one hand of finely divided aluminum hydrate and on the other hand of a compound selected from the group consisting of phosphorus pentoxide and phosphoric acid separately in separate portions of an inert nonaqueous liquid, mixing said dispersions, adding water, the reactants being present in the mixture of dispersions in the ratio ranging between 1 Al to 3($PO_4$) and 2 Al to 3($PO_4$), controlling the water content of the reaction product through the water content of the reactants, added water and reduction of evaporation to form a product having a water content low enough to render the product solid at room temperature but high enough to maintain the water soluble property thereof, and separating the aluminum phosphate formed.

5. A method of preparing water soluble aluminum phosphates solid at room temperature comprising dispersing with the aid of a fatty acid reactible compounds consisting on the one hand of finely divided aluminum hydrate and on the other hand of a compound selected from the group consisting of phosphorus pentoxide and phosphoric acid separately in separate portions of an inert nonaqueous liquid, mixing said dispersions in the presence of water, the reactants being present in the mixture of dispersions in the ratio ranging between 1 Al to 3($PO_4$) and 2 Al to 3($PO_4$), controlling the water content of the reaction product through the water content of the reactants, added water and reduction of evaporation to form a product having a water content ranging from zero for the 1:3 ratio to slightly over 25% for the 1½:3 ratio to about 35% for the 2:3 ratio and separating the aluminum phosphate formed.

6. A method of preparing water soluble aluminum phosphates solid at room temperature comprising dispersing reactible compounds consisting on the one hand of finely divided aluminum hydrate and on the other hand of a compound selected from the group consisting of phosphorus pentoxide and phosphoric acid separately in separate portions of an inert nonaqueous liquid, mixing said dispersions in the presence of water, the reactants being present in the mixture of dispersions in the ratio ranging between 1 Al to 3($PO_4$) and 2 Al to 3($PO_4$), controlling the water content of the reaction product through the water content of the reactants, added water and reduction of evaporation to form a product having a water content ranging from zero for the 1:3 ratio to slightly over 25% for the 1½:3 ratio to about 35% for the 2:3 ratio, agitating the liquid during formation of the dispersions and during the mixing of the dispersions, and separating the aluminum phosphate formed.

7. A method of preparing water soluble aluminum phosphates solid at room temperature comprising dispersing reactible compounds consisting on the one hand of finely divided aluminum hydrate and on the other hand of a compound selected from the group consisting of phosphorus pentoxide and phosphoric acid separately in separate portions of an inert nonaqueous liquid, mixing said dispersions, adding water, the reactants being present in the mixture of dispersions in the ratio ranging between 1 Al to 3(PO4) and 2 Al to 3(PO4), and separating the aluminum phosphate formed, the quantity of nonaqueous liquid being adjusted to maintain the reaction temperature below about 180° F., and the amount of water in the reaction product being controlled by the amount of contained water of the reactants, the added water, and temperature control to form a product having a water content ranging from zero for the 1:3 ratio to slightly over 25% for the 1½:3 ratio to about 35% for the 2:3 ratio.

8. A method of preparing water soluble aluminum phosphates solid at room temperature comprising dispersing a finely divided aluminum hydrate and finely divided phosphorus pentoxide separately in separate portions of an inert nonaqueous liquid, mixing said dispersions, adding water, the reactants being present in the mixture of dispersions in the ratio ranging between 1 Al to 3(PO4) and 2 Al to 3(PO4), separating the aluminum phosphate formed, and controlling the water content of the reaction product by adding regulated quantities of water during the reaction to form a product having a water content ranging from zero for the 1:3 ratio to slightly over 25% for the 1½:3 ratio to about 35% for the 2:3 ratio.

9. A method of preparing water soluble aluminum phosphates solid at room temperature comprising dispersing reactible compounds consisting on the one hand of finely divided aluminum hydrate and on the other hand of a compound selected from the group consisting of phosphorus pentoxide and phosphoric acid separately in separate portions of an inert organic liquid, mixing said dispersions in the presence of water, the reactants being present in the mixture of dispersions in the ratio ranging between 1 Al to 3(PO4) and 2 Al to 3(PO4), controlling the water content of the reaction product through the water content of the reactants, added water and reduction of evaporation to form a product having a water content ranging from zero for the 1:3 ratio to slightly over 25% for the 1½:3 ratio to about 35% for the 2:3 ratio, and separating the aluminum phosphate formed.

10. A method of preparing water soluble aluminum phosphates solid at room temperature comprising dispersing reactible compounds consisting on the one hand of finely divided aluminum hydrate and on the other hand of a compound selected from the group consisting of phosphorus pentoxide and phosphoric acid separately in separate portions of a light hydrocarbon oil, mixing said dispersions in the presence of water, the reactants being present in the mixture of dispersions in the ratio ranging between 1 Al to 3(PO4) and 2 Al to 3(PO4), controlling the water content of the reaction product through the water content of the reactants, added water and reduction of evaporation to form a product having a water content ranging from zero for the 1:3 ratio to slightly over 25% for the 1½:3 ratio to about 35% for the 2:3 ratio, and separating the aluminum phosphate formed.

11. A method of preparing water soluble aluminum phosphates solid at room temperature comprising dispersing reactible compounds consisting on the one hand of finely divided aluminum hydrate and on the other hand of a compound selected from the group consisting of phosphorus pentoxide and phosphoric acid separately in separate portions of kerosene, mixing said dispersions in the presence of water, the reactants being present in the mixture of dispersions in the ratio ranging between 1 Al to 3(PO4) and 2 Al to 3(PO4), controlling the water content of the reaction product through the water content of the reactants, added water and reduction of evaporation to form a product having a water content ranging from zero for the 1:3 ratio to slightly over 25% for the 1½:3 ratio to about 35% for the 2:3 ratio, and separating the aluminum phosphate formed.

HERBERT H. GREGER.